US012705935B2

(12) United States Patent
Lange et al.

(10) Patent No.: US 12,705,935 B2
(45) Date of Patent: Aug. 11, 2026

(54) SYSTEMS AND METHODS FOR DYNAMIC PRE-FILTERING WITH SAMPLING AND CACHING

(71) Applicant: TOYOTA MOTOR ENGINEERING & MANUFACTURING NORTH AMERICA, INC., Plano, TX (US)

(72) Inventors: Armin Lange, Addison, TX (US); Miles J. Johnson, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 578 days.

(21) Appl. No.: 16/680,358

(22) Filed: Nov. 11, 2019

(65) Prior Publication Data

US 2021/0142592 A1 May 13, 2021

(51) Int. Cl.

*G07C 5/00* (2006.01)
*G06F 18/2113* (2023.01)
*G06N 3/02* (2006.01)
*G06V 20/56* (2022.01)

(Continued)

(52) U.S. Cl.

CPC .......... *G07C 5/008* (2013.01); *G06F 18/2113* (2023.01); *G06N 3/02* (2013.01); *G06V 20/56* (2022.01); *G07C 5/0808* (2013.01); *G07C 5/0841* (2013.01); *H04W 4/40* (2018.02)

(58) Field of Classification Search

CPC .... G07C 5/0808; G07C 5/008; G07C 5/0841; H04W 4/40; H04W 4/44; G06K 9/623; G06N 3/02

See application file for complete search history.

(56) References Cited

U.S. PATENT DOCUMENTS 9,766,625 B2 9/2017 Boroditsky
2017/0186317 A1* 6/2017 Franklin .............. G08G 1/0175
2017/0228258 A1 8/2017 Shifman (Continued)

FOREIGN PATENT DOCUMENTS

EP 2660667 11/2013

OTHER PUBLICATIONS

English Translation of Publication No. CN109774389A Author: Zong, Pei-Liang Title: An Indirect Tire Pressure Monitoring Method Based on Spectrum Analysis Date: May 21, 2019 (Year: 2019).*

*Primary Examiner* — James J Lee
*Assistant Examiner* — Steven Vu Nguyen
(74) *Attorney, Agent, or Firm* — SHEPPARD, MULLIN, RICHTER & HAMPTON LLP; Daniel N. Yannuzzi

(57) ABSTRACT

Systems and methods are provided for pre-filtering vehicle-related data obtained from vehicle sensors, V2X communications with roadside infrastructure or vehicles, and/or third-party information sources. The amount of data received from such data sources can be massive. The systems and methods pre-filter the data at the vehicle prior to transmission to an artificial intelligence or machine learning system for analysis so that the amount of data transmitted can be reduced, easing the demand on communication and data processing resources. Moreover, the speed at which the transmitted data can be analyzed is increased relative to conventional systems that rely on characterizing scenarios, training models, predicting events, etc. using as much information as can be collected.

13 Claims, 6 Drawing Sheets

(51) Int. Cl.

| | |
|---|---|
| ***G07C 5/08*** | (2006.01) |
| ***H04W 4/40*** | (2018.01) |

(56) References Cited

U.S. PATENT DOCUMENTS

2017/0358204 A1* 12/2017 Modica ................. H04W 4/021
2018/0047221 A1* 2/2018 Abuelsaad ........... G07C 5/0808
2018/0351818 A1* 12/2018 Mohanram ........... H04L 41/145
2019/0266029 A1* 8/2019 Sathyanarayana ..... B60K 35/00
2020/0294385 A1* 9/2020 Lowe ...................... H04W 4/38
2022/0036666 A1* 2/2022 Mondello ................ G06N 5/04

* cited by examiner

SYSTEMS AND METHODS FOR DYNAMIC PRE-FILTERING WITH SAMPLING AND CACHING

TECHNICAL FIELD

The present disclosure relates generally to machine learning (ML) and artificial intelligence (AI) techniques, and in particular, some implementations may relate to reducing the amount of data exchanged between a data gathering entity, such as a vehicle, and a remote processing or computing entity, such as an edge computing device or cloud computing server.

DESCRIPTION OF RELATED ART

Current estimates indicate that vehicles can collect and/or able to generate huge amounts of data, e.g., up to 4 TB of data every 1.5 hours for an autonomous vehicle. Accordingly, the amount of storage needed to maintain that data, as well as the amount of communications resources needed to transfer that data to the cloud for processing is enormous, and prohibitive given current technologies.

BRIEF SUMMARY OF THE DISCLOSURE

In accordance with one embodiment, a method comprises collecting vehicle-related data, and determining a number of data points necessary for performing at least one of an extrapolation function and an interpolation function. The method further comprises extracting the number of data points commensurate with the necessary number of data points from the collected vehicle-related data. Further still, the method comprises transmitting the data points to an entity performing the at least one of the extrapolation function and the interpolation function.

In one embodiment, the at least one of the extrapolation function and the interpolation function generates an input to a data-reduced artificial intelligence analytics system.

In one embodiment, the determination of the number of data points is based on the number of data points specified in a scenario pattern determined by one of a network edge device, a cloud server, or an artificial intelligence analytics system resident on a vehicle associated with the vehicle-related data.

In one embodiment, the vehicle-related data originates from at least one of the vehicle, another vehicle in communication with the vehicle, and a third-party information source.

In one embodiment, the collected vehicle data comprises a first data point associated with a first type of vehicle-related data.

In one embodiment, the method further comprises collecting a second data point associated with a second type of vehicle-related data related to the first type of vehicle-related data.

In one embodiment, the relationship between the first and second types of vehicle-related data is specified by one of a scenario pattern and a previously identified relationship.

In one embodiment, the number of data points necessary for performing the at least one of the extrapolation function and the interpolation function is less than a total number of data points available in the collected vehicle-related data.

In accordance with another embodiment, a pre-filtering circuit of a vehicle, comprises a processor, and a memory unit operatively connected to the processor including instructions that when executed cause the processor to perform the following: sense first anomalous vehicle-related data; analyzing currently collected vehicle-related data to determine existence of second anomalous vehicle-related data; attempt to correlate the first and second anomalous vehicle-related data, and if correlatable, analyze a series of events represented by the first and second anomalous vehicle-related data. Upon a determination that the series of events warrants further analysis, additional vehicle-related data associated with the first and second anomalous vehicle-related data is collected. Additionally, the first and second anomalous vehicle-related data and the additional vehicle-related data are transmitted to a computing entity performing at least one of an extrapolation function and an interpolation function on the first and second anomalous vehicle-related data and the additional vehicle-related data to characterize the series of events.

In one embodiment, the first and second anomalous vehicle-related data comprise anomalous data values relative to first and second thresholds, respectively.

In one embodiment, the first and second thresholds characterize preferred vehicle operating limits or conditions.

In one embodiment, the instructions that when executed cause the processor to attempt to correlate the first and second anomalous vehicle-related data, comprise instructions to base the attempted correlation on one of a scenario pattern specified by the entity performing the at least one of the extrapolation function and the interpolation function or relational information pre-programmed in the pre-filtering circuit.

In one embodiment, the automated reasoning module further performs the following: in response to determining that the weight values associated with the current iteration of training fails to satisfy the safety constraint, generating counterexamples of a safe state associated with the artificial neural network and with respect to the safety constraint.

In accordance with still another embodiment, a vehicle comprises a communications circuit receiving vehicle-related data, and a pre-filtering circuit operatively connected to the communications circuit. The pre-filtering circuit determines whether the received vehicle-related data contains first anomalous data relative to a first vehicle operating threshold. In response to a determination that the received vehicle-related data contains first anomalous data, collecting additional vehicle-related data comprising second anomalous data relative to a second vehicle operating threshold is triggered. Furthermore, the pre-filtering circuit transmits the first and second anomalous data to an artificial intelligence system analyzing the first and second anomalous data to characterize one or more vehicle-related events represented by the first and second anomalous data. The first and second anomalous data amount to a number of data points that is less than a number of data points that can be extracted from the received vehicle-related data and the additional vehicle-related data.

In one embodiment, the vehicle further comprises a plurality of operational sensors from which at least a portion of the vehicle-related data and the additional vehicle-related data originates.

In one embodiment, the communications circuit receives vehicle-to-everything communications from at least one of a roadside unit and a neighboring vehicle from which at least a portion of the vehicle-related data and the additional vehicle-related data originates.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
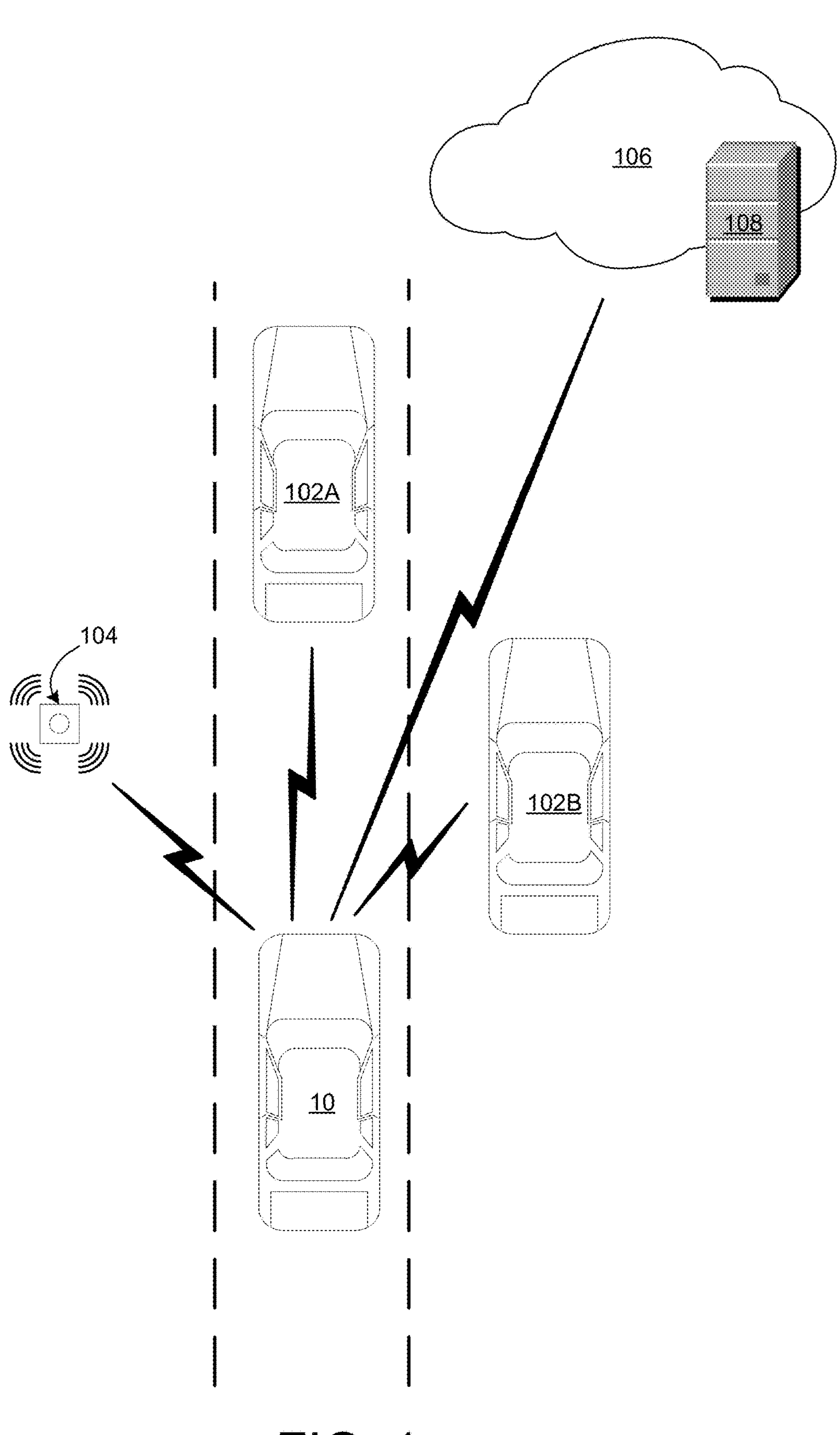
FIG. 1 is an example environment in which pre-filtering of vehicle-related data is performed prior to transmission to an AI system.

The figures are not exhaustive and do not limit the present disclosure to the precise form disclosed.

DETAILED DESCRIPTION

Embodiments of the systems and methods disclosed herein can reduce or limit the amount of data that is sent to the cloud or network edge. Vehicles, such as autonomous vehicles or even conventional vehicles, may collect enormous amounts of data from various in-vehicle sensors, e.g., vehicle speed data, braking event data, passenger biometric data, etc. Vehicles may also receive large amounts of data from other vehicles (via vehicle-to-vehicle (V2V) communications), roadway infrastructure (via vehicle-to-infrastructure (V2I) communications), and/or other data sources. Those other data sources may include third-party data providers, e.g., traffic-information service providers, as a result of mobile device-vehicle interactions, etc. (generally, connected car technologies). Along with this large amount of data, is the need to transfer the data to the cloud or one or more networks for analysis/processing, which can be taxing from a resource perspective, as well as a cost perspective.

By pre-filtering data (prior to transmission to the cloud or network edge), the need for storage and communications resources diminishes greatly, not to mention the associated costs drop commensurately. Further still, any latency associated with aggregating and processing large amounts of data can be reduced or eliminated altogether, resulting in faster data analysis. For example, AI or ML models can be trained more quickly and with less data. This disrupts the conventional notion that AI/ML systems require large amounts of data to be able to learn effectively. Moreover, in-vehicle communications infrastructure can be simplified (e.g., transmit in shorter bursts) and/or made to transmit in only ideal conditions, as less data needs to be transmitted to the cloud or network edge.

In particular, in-vehicle sensors may be used to capture data, and one or more data caches/buffers can be implemented in the vehicle for storing sensor data, as well as data received from other sources (examples of which are discussed above). Pre-filtering of this data can be dynamic or static in nature. For example, pre-filtering of data can be performed by a pre-filtering circuit, where time limits or select time periods during which captured data may be transmitted to the cloud can be set, rather than sending any and all collected/generated data to the cloud. For example, brake pedal actuation sensor data may be sampled only every other minute, where brake pedal actuation sensor data captured outside the selected time period is discarded. As another example, only data exceeding a set threshold will trigger a transmit event, e.g., acceleration over a set acceleration rate threshold, will be sent to the cloud for analysis/processing. This can be done in real-time or by analyzing cached data (at the vehicle), where any unused data is subsequently discarded.

In still other embodiments, pre-filtering of data can be performed contingent upon multiple factors being present/multiple thresholds being met or exceeded (or not meeting a threshold). For example, hard braking events may be captured and transmitted only if the hard braking events occur within two seconds of an acceleration event that surpasses some set acceleration threshold. Another example may involve collecting and/or transmitting "serially-related" data. That is, instead of collecting data as separate data elements (leaving aggregation of the data to be performed based on later-determined relationships between the separate data elements), data can be collected serially. That is, the collection of a first data element can trigger the collection of one or more other, related data elements that would need to be collected in order to make the first data element useful.

Moreover, pre-filtering data can result in certain data provided by one source being determined as indicative of the same/similar information as data being provided by another source, and the other source can be disregarded, again reducing the amount of data collection/transmission. Thus, data collection can be configured to result in automatically and dynamically pre-filtered data. In some embodiments, the collection of other data can involve requesting and/or triggering data collection in another vehicle(s), roadway infrastructure, third-party information provider, etc.

In order to achieve the above-described functionality, a vehicle may include a pre-filtering circuit or system, which can be implemented in hardware, software, or both. The pre-filtering circuit may, in some embodiments, review time stamps associated with collected data, and store (as pre-filtered data to be transmitted) only that data associated with a determined time, range, or period, disregarding or discarding collected data falling outside of the determined time, range, or period. In other embodiments, upon receipt of a first data element, the pre-filtering circuit may determine whether or not the first data element meets, exceeds, or falls below a threshold(s) (depending on the type of data element). If additional data collection is warranted based on the first data element's relation to the threshold(s), the pre-filtering circuit may trigger additional data collection.

In still other embodiments, the pre-filtering circuit may implement a data reduction function. In particular, the pre-filtering circuit may take some subset of collected data that allows for data extrapolation or interpolation. For example, the pre-filtering circuit may cache every fifth value of a particular series or set of data collected by a particular sensor(s). In some embodiments, the cloud server or network edge element to which the pre-filtered data is to be sent may determine the particular subset of data to transmitted, e.g., a scenario pattern. That is, a cloud server may require a minimum of four values during a particular type of driving event in order to achieve a desired level of detail for analyzing a scenario or event, for predicting an event, etc.

FIG. 1 illustrates an example data collection and pre-filtering scenario in accordance with various embodiments. A vehicle 10 may have one or more sensors (not shown in FIG. 1), e.g., vehicle operating conditions sensors, environmental sensors. For example, vehicle 10 may have proximity sensors that can gather data regarding nearby objects or other vehicles, e.g., vehicles 102A and 102B. Vehicle 10 may further have vehicle-to-everything (V2X) communications capabilities, allowing vehicle 10 to communicate with roadside unit/equipment (RSU/RSE) or other roadside infrastructure, such as RSU 104 (which may be a V2I-enabled street light, for example). Vehicle 10 may also communicate with other vehicles, e.g., vehicles 102A and 102B, over V2V communications. It should be understood that sometimes, a vehicle itself may act as a network node or edge computing device. For example, vehicle 102B may be a network edge device. The data gathered by vehicle 10, either through its own sensors, or other data sources, e.g., RSU 104 and vehicles 102A and 102B, will ultimately be transmitted to a network edge device, such as vehicle 102B and/or to the cloud, e.g., a cloud server 108 resident on network 106. Cloud server 108 may be any computational server, such as a server utilizing artificial intelligence systems and/or methods to model and predict vehicle response to safety hazards, autonomous vehicle operation, predictive navigation, and so on.

For example, vehicle 10 may be receiving in-vehicle sensor information suggesting the operator of vehicle 10 is braking, e.g., a brake pedal actuation sensor. Likewise, vehicle speed sensed by a wheel rotation sensor also suggests a slow-down of vehicle 10. Additionally, both vehicle 102A and vehicle 102B transmit V2V communications data indicating that they too are slowing down, while RSU 104 transmits V2I communications data indicating that traffic within its sensed region appears to be experiencing a slow-down. In some embodiments, the aforementioned pre-filtering circuit (described in greater detail below) may determine that the data collected regarding the slow-down of vehicle 10 is cumulative or overlaps, and thus, only brake pedal actuation data is sent to cloud server 108. In some embodiments, the pre-filtering circuit may only transmit brake pedal actuation data corresponding to every second of a five-second period of time, despite the brake pedal actuation sensor collects data every 1/100 of a second. In some embodiments, cloud server 108 may specify this type of data collection based on a determined scenario pattern, which in turn can be based on previous experience that the requisite level of detail describing and/or associated with a similar event can be obtained with five data points upon which extrapolation can be based.

In other embodiments, the pre-filtering circuit may obtain the brake pedal actuation sensor data, and if it exceeds a brake pedal actuation threshold suggesting abnormally hard braking, will obtain additional sensor data, such as proximity sensor data, which in turn can trigger obtaining data from RSU 104 that may be used to verify that obtained from the proximity sensor. Accordingly, the brake pedal actuation sensor data, the proximity sensor data, and the RSU 104 data corresponding to a particular time period may be sent to cloud server 108 or to vehicle 102B (acting as a network edge device).

As referred to herein, AI can be described as an automated computer process(es) that can intelligently leverage data analysis for training itself for further optimizing the processes. ML can be generally considered an application of AI. AI techniques can include various approaches that are used in the area to achieve automated data analysis, such as neural, automated reasoning analysis (e.g., satisfiability modulo theories), and so on. AI-based techniques can be used to enhance computer-controlled features of vehicles in a manner that improves driving safety (e.g., a reduction of potential crashes), provides uniform traffic flow, and optimizes driving performance of vehicles (e.g., fuel efficiency) for a practical application and/or operational environment, as noted above.

For purposes of illustration, embodiments are described here with respect to automobiles. However, it should be appreciated that the safety-aware AI techniques disclosed herein are not limited to automobiles. The systems and methods disclosed herein may be implemented with any of a number of different vehicles and vehicle types. For example, the safety-aware AI systems and methods disclosed herein may be used with automobiles, trucks, motorcycles, boats, recreational vehicles and other like on- or off-road vehicles. In addition, the principals disclosed herein may also extend to other vehicle types as well.

According to an embodiment, vehicle 10 of FIG. 1 can be an autonomous vehicle. As used herein, “autonomous vehicle” can refer to a vehicle that is configured to operate in an autonomous operational mode. “Autonomous operational mode” can refer to the use of one or more computing systems of the vehicle 10 to navigate and/or maneuver vehicle 10 along a travel route with a level of input from a human driver which can vary with the operational mode. As such, vehicle 10 can have a plurality of autonomous operational modes. In some embodiments, the vehicle 10 can have an unmonitored autonomous operational mode meaning that one or more computing systems are used to maneuver the vehicle 10 along a travel route fully autonomously, requiring no input or supervision required from a human driver.

Alternatively, or in addition to the above-described modes, vehicle 10 can have one or more semi-autonomous operational modes. “Semi-autonomous operational mode” can refer to mode whereby a portion of the navigation and/or maneuvering of the vehicle 10 along a travel route is performed by one or more computing systems, and a portion of the navigation and/or maneuvering of the vehicle 10 along a travel route is performed by a human driver. One example of a semi-autonomous operational mode is when an adaptive cruise control system is activated. In such case, the speed of vehicle 10 can be automatically adjusted to maintain a safe distance from a vehicle ahead based on data received from on-board sensors, but the vehicle 10 is otherwise operated manually by a human driver. Upon receiving a driver input to alter the speed of the vehicle (e.g. by depressing the brake pedal to reduce the speed of the vehicle 10), the adaptive cruise control system is deactivated, and the speed of the vehicle is reduced.

In order to achieve the above-described modes of operation (or other manner of operating or utilizing vehicle 10), AI or ML systems and methods may be used to predict or implement operational commands or instructions, e.g., from an electronic control unit (ECU) of vehicle 10. Such AI or ML systems may rely on models trained using data from vehicle 10 (or other vehicles), for example. This data, as described above, can be pre-filtered. In some embodiments, vehicle 10 may include a resident AI/ML system (not shown) that relies on sensed data. This sensed data may also be pre-filtered reducing the amount of data that the resident AI/ML system needs to process or analyze. Even in vehicle 10, a reduction in the amount of data that needs to be stored, processed, transmitted between systems in vehicle 10 will be improved, again, through more efficient resource utilization, reduced storage needs, faster learning, etc.

Figure 2:
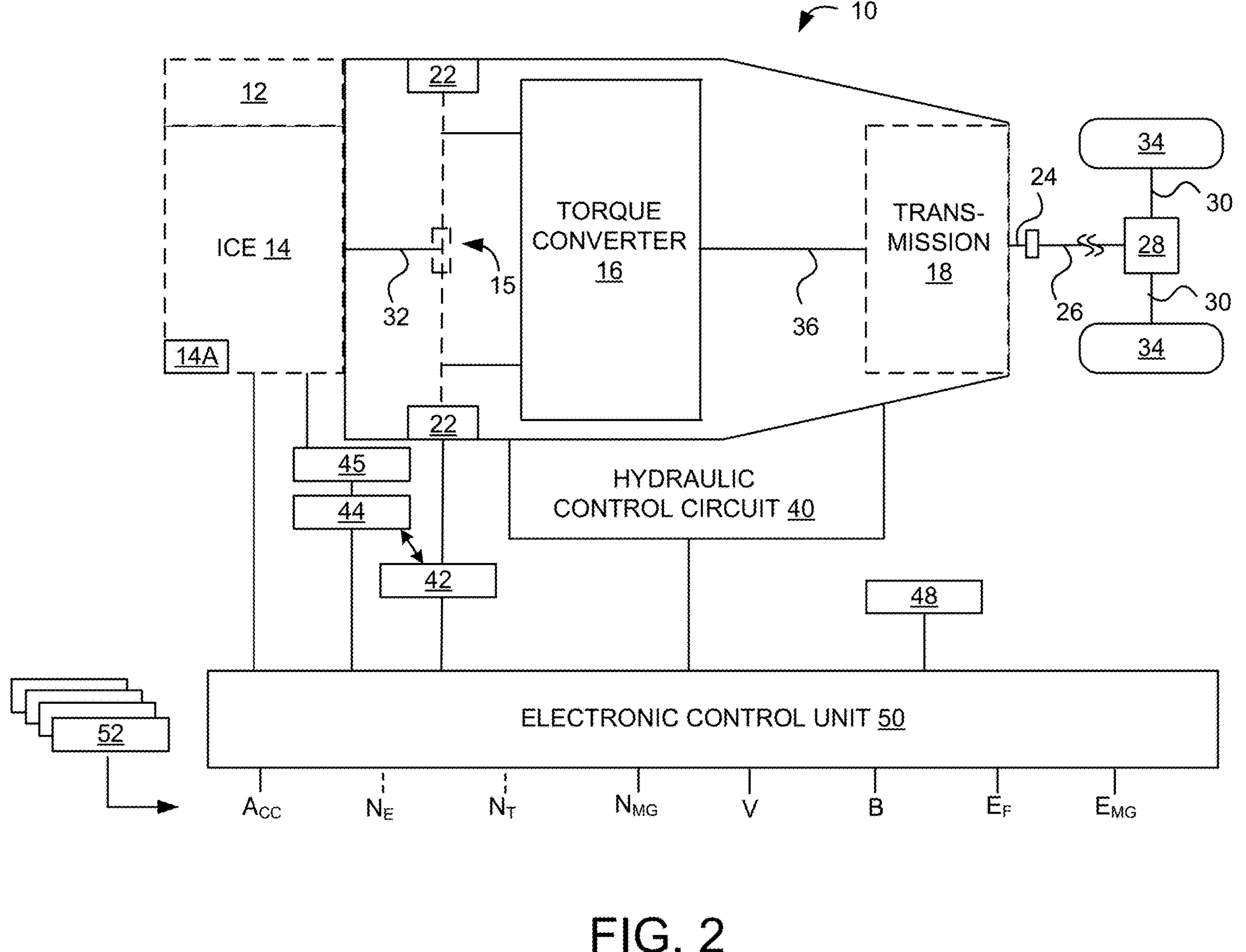
FIG. 2 is a schematic representation of an example vehicle with which embodiments of the pre-filtering systems and methods disclosed herein may be implemented.

An example vehicle in which embodiments of the disclosed technology may be implemented is illustrated in FIG. 2. Although the example described with reference to FIG. 2 is a hybrid type of vehicle, the systems and methods described herein can be implemented in other types of vehicles including gasoline- or diesel-powered vehicles, fuel-cell vehicles, electric vehicles, or other vehicles.

FIG. 2 illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 10 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 10 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 10 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 10, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 10.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 10 and/or information/data about such objects. Such objects can be stationary objects and/or dynamic objects. Further, the sensors can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 10 and/or information/data about such objects. Such objects can be stationary objects and/or dynamic objects. Further, the sensors can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

Figure 3:
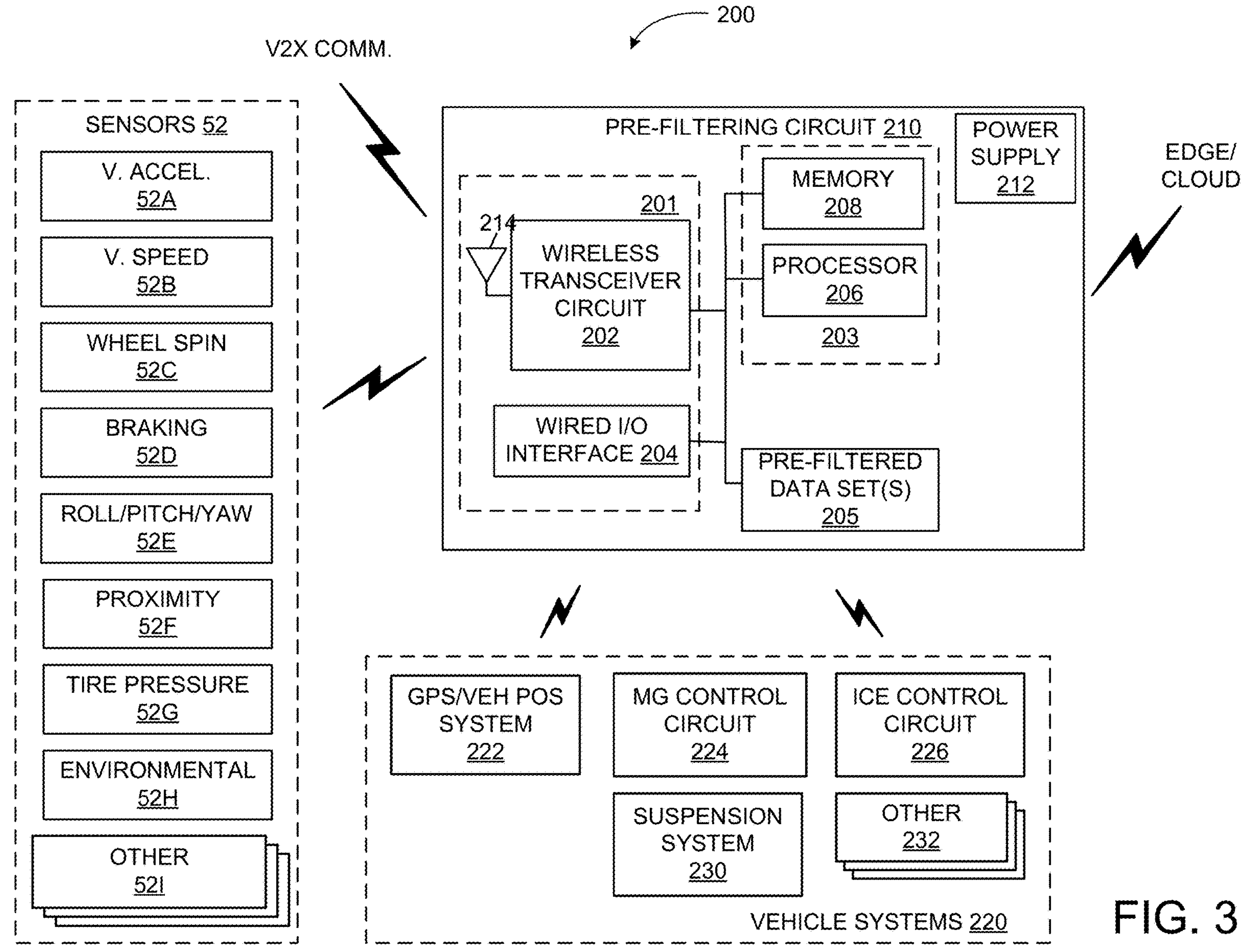
FIG. 3 illustrates an example architecture pre-filtering in accordance with one embodiment of the systems and methods described herein.

FIG. 3 illustrates an example architecture for pre-filtering in accordance with one embodiment of the systems and methods described herein. Referring now to FIG. 3, in this example, pre-filtering system 200 includes a pre-filtering circuit 210, the plurality of sensors 52, and one or more vehicle systems 220. Sensors 52 and vehicle systems 220 can communicate with pre-filtering circuit 210 via a wired or wireless communication interface. Although sensors 52 and vehicle systems 220 are depicted as communicating with pre-filtering circuit 210, they can also communicate with each other as well as with other vehicle systems. Pre-filtering circuit 210 can be implemented as an ECU or as part of an ECU such as, for example ECU 50. In other embodiments, pre-filtering circuit 210 can be implemented independently of an ECU.

Pre-filtering circuit 210 in this example includes a communication circuit 201, a decision circuit 203 (including a processor 206 and memory 208 in this example) and a power supply 212. Components of pre-filtering circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to control pre-filtering circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up pre-filtering circuit 210.

Communication circuit 201 either or both a wireless transceiver circuit 202 with an associated antenna 214 and a wired I/O interface 204 with an associated hardwired data port (not illustrated). As this example illustrates, communications with pre-filtering circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by pre-filtering circuit 210 to/from other entities such as sensors 52 and vehicle systems 220.

Wired I/O interface 204 can include a transmitter and a receiver (not shown) for hardwired communications with other devices. For example, wired I/O interface 204 can provide a hardwired interface to other components, including sensors 52 and vehicle systems 220. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 2. Sensors 52 can include additional sensors that may or not otherwise be included on a standard vehicle with which the pre-filtering system 200 is implemented. In the illustrated example, sensors 52 include vehicle acceleration sensors 52A, vehicle speed sensors 52B, wheelspin sensors 52C (e.g., one for each wheel), a tire pressure monitoring system (TPMS) 52G, accelerometers such as a 3-axis accelerometer 52E to detect roll, pitch and yaw of the vehicle, proximity sensors 52E, and environmental sensors 52H (e.g., to detect precipitation or other environmental conditions). Additional sensors 52I can also be included as may be appropriate for a given implementation of pre-filtering system 200.

Vehicle systems 220 can include any of a number of different vehicle components or subsystems used to control or monitor various aspects of a vehicle, e.g., vehicle 10, and its performance. In this example, vehicle systems 220 include a GPS or other vehicle positioning system 222; motor control circuits 224 to control operation of motor/generator 22; engine control circuits 226 to control the operation of the engine (e.g. internal combustion engine 14); suspension system 230 such as, for example, an adjustable-height air suspension system, and other vehicle systems 232.

In operation, pre-filtering circuit 210, by way of communication circuit 201, can receive data from various vehicle sensors 52 regarding vehicle operating conditions, environmental conditions, and/or other conditions relevant to operation of the vehicle, e.g., proximity information regarding road obstacles, neighboring vehicles, etc. Pre-filtering circuit 210 may also receive information relevant to operation of the vehicle via V2X communications, e.g., upcoming traffic information, road speed limit information, and the like. As alluded to above, one or more vehicle systems 220 may also provide information relevant to vehicle operation to pre-filtering circuit 210. As can be appreciated, the amount of data/information available to and generated by the vehicle itself is sizable, especially considering that sensors 52, for example, may be configured to collect information about their respective components/operations continuously, e.g., every 1/100 of a second.

In some embodiments, upon receipt of the aforementioned data and/or information, the data/information may be stored in memory 208, e.g., in a cache or buffer portion of memory 208. Decision circuit 203 may access memory 208 to analyze the received data/information to determine what data/information should be retained and/or transmitted to the edge/cloud for use, e.g., by a cloud server to train an AI model. Afterwards, that pre-filtered data may comprise a pre-filtered data set that is transmitted on. In some embodiments, a network edge device or the aforementioned cloud server may have a scenario pattern or profile that requires a particular number of data points. In some embodiments, such a scenario pattern or profile may be shared with the pre-filtering circuit 210 so that the requisite number of data points can be extracted by pre-filtering circuit 210 from the received data/information. In some embodiments, a network edge device or cloud server may simply transmit instructions to pre-filtering circuit 210 regarding the number of data points that are required in order for the cloud server or network edge device to extrapolate or interpolate one or more estimated values based on the data points. In still other embodiments, pre-filtering circuit 210 may be pre-programmed with scenario patterns so that pre-filtering circuit 210 can determine, depending on a particular scenario, collect or cull the received or generated data/information accordingly prior to transmission to a network edge device or cloud server.

For example, a cloud server training a predicted safety-response AI model may require 5 data points regarding vehicle speed while the vehicle is traversing a high velocity curve in the road. Although vehicle speed sensor 52B may collect vehicle speed information every 1/100 of a second resulting in 100 data points per second, the high velocity curve scenario pattern may only require 5 data points per second in order to allow the cloud server to train the predicted safety-response AI model. Thus, decision circuit 203 effectively performs a data reduction function. In this way, the cloud server, for example, can apply linear extrapolation to the data points received from pre-filtering circuit 210. In some embodiments, pre-filtering circuit 210 may append counter information to the data points to indicate to the cloud server or network edge device how many data points are being sent/have been sent.

In some embodiments, decision circuit 203 of pre-filtering circuit 210 may further reduce the amount of data/information that is sent by simply transmitting or uploading values, e.g., in comma-separated value (CSV) format. That is, for a particular event or series of events, e.g., within a particular time period, the requisite values may be put in a CSV file, e.g., one embodiment of pre-filtered data set 205, for transmission to the cloud server. The cloud server may run an extrapolation process(es) on the values contained in the CSV file, and for example, may run an identification algorithm to determine if the values indicate the same/similar scenario as what was predicted, to analyze the scenario or event(s), or to be used as feedback to make an AI model more accurate. In some embodiments, the results of the AI modeling, training, prediction, etc. can be fed back into one or more of the vehicle systems 220. For example, and following the above example, if the scenario or event(s) represented by the pre-filtered data is the same/similar as the predicted scenario or event(s), a determined response regarding vehicle positioning or re-positioning may be performed by GPS/vehicle positioning system 222. If the scenario or events involved traversal of a high velocity curve, the network edge device or cloud server may respond by instructing suspension system 230 to stiffen vehicle 10's suspension.

In some embodiments, due to the reduced amount of data that is sent for processing, communication circuit 201 may leverage burst transmissions to the network edge device or cloud server or is able to send all the requisite data in a single transmission or message, for example. Because the network edge device or cloud server has to process, analyze or otherwise address less data, it can perform its analysis or data processing more quickly, resulting in a faster result or output. In turn, that result or output can be more quickly reflected in one or more vehicle systems 220, e.g., in real-time or near-real time.

In accordance with other embodiments, decision circuit 210 may receive first data, e.g., a first sensor data from one or more of sensors 52. Based on pre-programmed or determined scenario patterns, decision circuit 210 may obtain or request second sensor data to be obtained from an additional sensor(s) or additional data from other data sources, based on the first sensor data. That is, a particular scenario pattern may comprise a series of sensor data, and when first sensor data corresponds to one of the series of sensor data in the scenario pattern, decision circuit 203 may trigger data collection regarding other ones of the series of sensor data. In some embodiments, the triggering of "serial" data collection may be prompted by data, e.g., sensor data, whose value relative to a threshold, necessitates additional data collection.

For example, a braking event may be sensed by braking sensor 52D. If the braking sensor 52D senses a braking event, that braking sensor data is transmitted to pre-filtering circuit 210. Decision circuit 203 of pre-filtering circuit 210 may analyze the braking sensor data, and determine that it exceeds a hard braking threshold, at which point, decision circuit 203 triggers data collection from proximity sensor 52F in order to determine whether or not the hard braking event was the result of an upcoming obstacle or neighboring vehicle(s). If proximity sensor 52F transmits data indicating no upcoming obstacle or neighboring vehicle, decision circuit 203 may trigger data collection from the tire pressure sensor 52G to determine if the hard braking event could be attributed to a loss of tire pressure (flat), and so on. In this way, data collection can be predicated on the existence of a particular data element, thereby avoiding conventional data collection that generally occurs in a non-discriminatory fashion, which in turn reduces the amount of data that is ultimately collected and transmitted to a processing or analysis element, such as a network edge device, cloud server, or resident AI system.

In other embodiments, the receipt of first data at pre-filtering circuit 210 that meets, exceeds, or fails to meet a particular threshold, decision circuit 210 may access memory 208 to look for other data instances that have met, exceeded, or failed to meet a related threshold. For example, sensor data may be collected by pre-filtering circuit 210, and stored in a data cache or buffer portion of memory 208. Upon receiving data from wheel spin sensor 52C that exceeds a wheel spin threshold, decision circuit 203 may access memory 208 to search for other data, e.g., roll/pitch/yaw data from sensor 52E whose value(s) relative to a roll/pitch/yaw threshold may indicate the existence or occurrence of a particular event(s) or road/environmental condition.

In some embodiments, the transmission of data to a network edge device, a cloud server, or resident AI system in vehicle 10 can be performed in similarly "serial" fashion. That is, first data or a first set of data may be received by pre-filtering circuit 210, which is then transmitted to a following the above example, upon receipt of data from wheel spin sensor 52C that exceeds a wheel spin threshold, decision circuit 203 may determine that the sensor data from wheel spin sensor 52C is to be sent out. However, in this embodiment, decision circuit 203 will wait for a response from the receiving network edge device, cloud server, or other AI system requesting additional data be obtained. That is, the network edge device, cloud server, or other AI system may, in real-time or within some specified time period (provided data is maintained in memory 208), analyze or process the data from wheel spin sensor 52C and make a determination that additional data is needed. The network edge device, cloud server, or AI system can then respond to the receipt of the wheel sensor data and indicate to decision circuit 203 that it should obtain that additional data, i.e., roll/pitch/yaw data from sensor 52E. Decision circuit 203 can then obtain that data from memory 208.

For example, the network edge device, cloud server, or AI system may make the determination to obtain additional data based on a known or predicted scenario pattern. Alternatively, the network edge device, cloud server, or AI system may make the determination to obtain additional data based on extrapolation/interpolation of the received data not resulting in the desired accuracy, output granularity, etc. Thus, even if the scenario or received data is not yet associated with a known scenario or expected event(s), certain types of data can be focused on. For example, a determination may be made by the network edge device, cloud server, or AI system (or even the decision circuit 203) to obtain additional information from sensors or data sources that are known to be impacted or have an impact on an element from which or with which the first received data is associated. Again, the transmission and analysis of excessive amounts of data can be avoided as a result of this manner of data collection. It should be noted that in some embodiments, for example, this edge/cloud-driven data collection can be used to direct other vehicles' data collection mechanisms. For example, upon a cloud server obtaining five data points per second from a first vehicle regarding some event(s) or scenario, the cloud server may determine that only three data points per second are needed to perform the desired analysis/make a prediction with the requisite accuracy. Accordingly, the cloud server may instruct vehicles neighboring the first vehicle to only collect three data points per second, e.g., by updating a scenario pattern or through direct instruction (vis-à-vis V2X communications).

Figure 4:
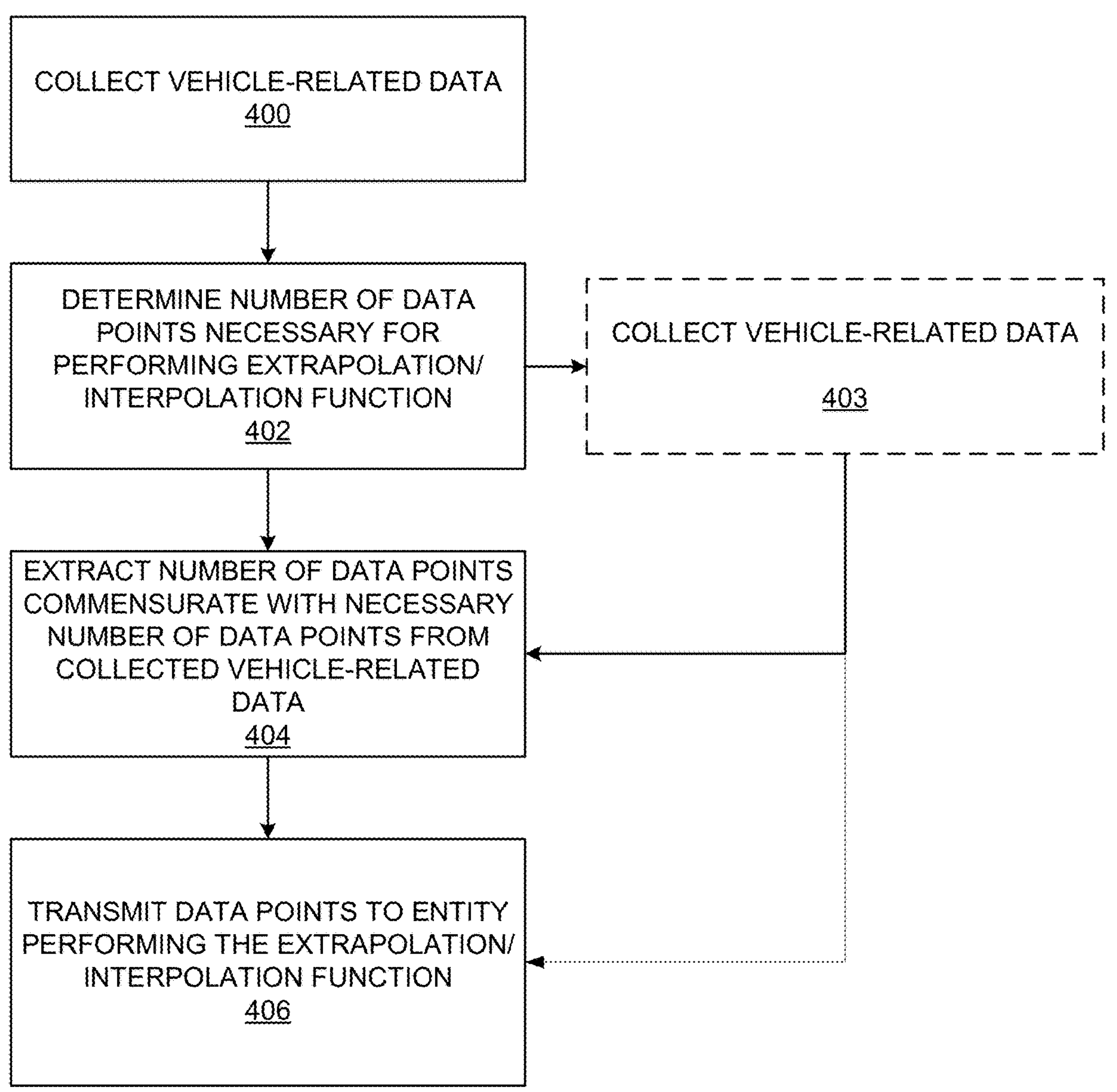
FIG. 4 is a flow chart illustrating example operations for implementation pre-filtering in accordance with one embodiment.

FIG. 4 is a flow chart illustrating example operations that can be performed to pre-filter data in accordance with one embodiment of the present disclosure. The operations illustrated in FIG. 4 and described herein can be performed by pre-filtering circuit 210, for example. At operation 400, vehicle-related data is collected. As described above, a vehicle, e.g., vehicle 10, may have various on-board sensors 52, and can receive information from other data sources, such as other vehicles, RSUs, third-party information sources, such as traffic information providers. Data can be collected and stored by pre-filtering circuit 210, in particular, by decision circuit 203 and memory 208, respectively.

At operation 402, a number of data points necessary for performing at least one of an extrapolation and interpolation function is determined. For example, a scenario pattern may be used/referenced to determine the number of data points needed to make a prediction, confirm a scenario or event, or perform any relevant AI or ML analysis of data. In some embodiments, the pre-filtering circuit 210, in particular, the decision circuit 203, may be pre-programmed with information/instructions regarding the requisite number of data points that should be collected for transmission to the entity performing the extrapolation/interpolation function. In other embodiments, that entity may in real-time or within a particular time period, instruct the pre-filtering circuit 210 as to how many data points are needed. In still other embodiments, that entity may update a scenario pattern or adjust its instructions regarding the number of data points that are needed. In this way, even if vehicle sensors are constantly or continuously collecting data, if the vehicle is receiving copious amounts of information, only the requisite data needed for AI/ML use is actually sent.

At operation 404, the number of data points commensurate with the necessary number of data points are extracted from the collected vehicle-related data. It should be understood that an AI model, for example, or the scenario pattern may dictate whether the necessary data points are equally (e.g., every X seconds) or non-equally distributed relative to time of collection. In some embodiments, pre-filtering circuit 210 may trigger the collection of vehicle-related data only after determining the number of data points needed for performing the extrapolation/interpolation function at operation 403. In this case, decision circuit 203 may explicitly query a certain data sensor(s) or request data from a particular data source(s) rather than access already-collected data matching a particular time stamp, time period, or other data collection parameter for obtaining the requisite number of data points.

At operation 406, the extracted data points are transmitted to the entity performing the at least one of the extrapolation and interpolation function. Again, the entity may be a network edge device, a cloud server, or some AI/ML system resident on the vehicle. In this way, the amount of data transmitted can be reduced. Moreover, as a result of transmitting less data, the communications resources needed for transmission are occupied less and/or the communication resources need not be as robust as might normally be required when large amounts of data need to be transferred.

Figure 5:
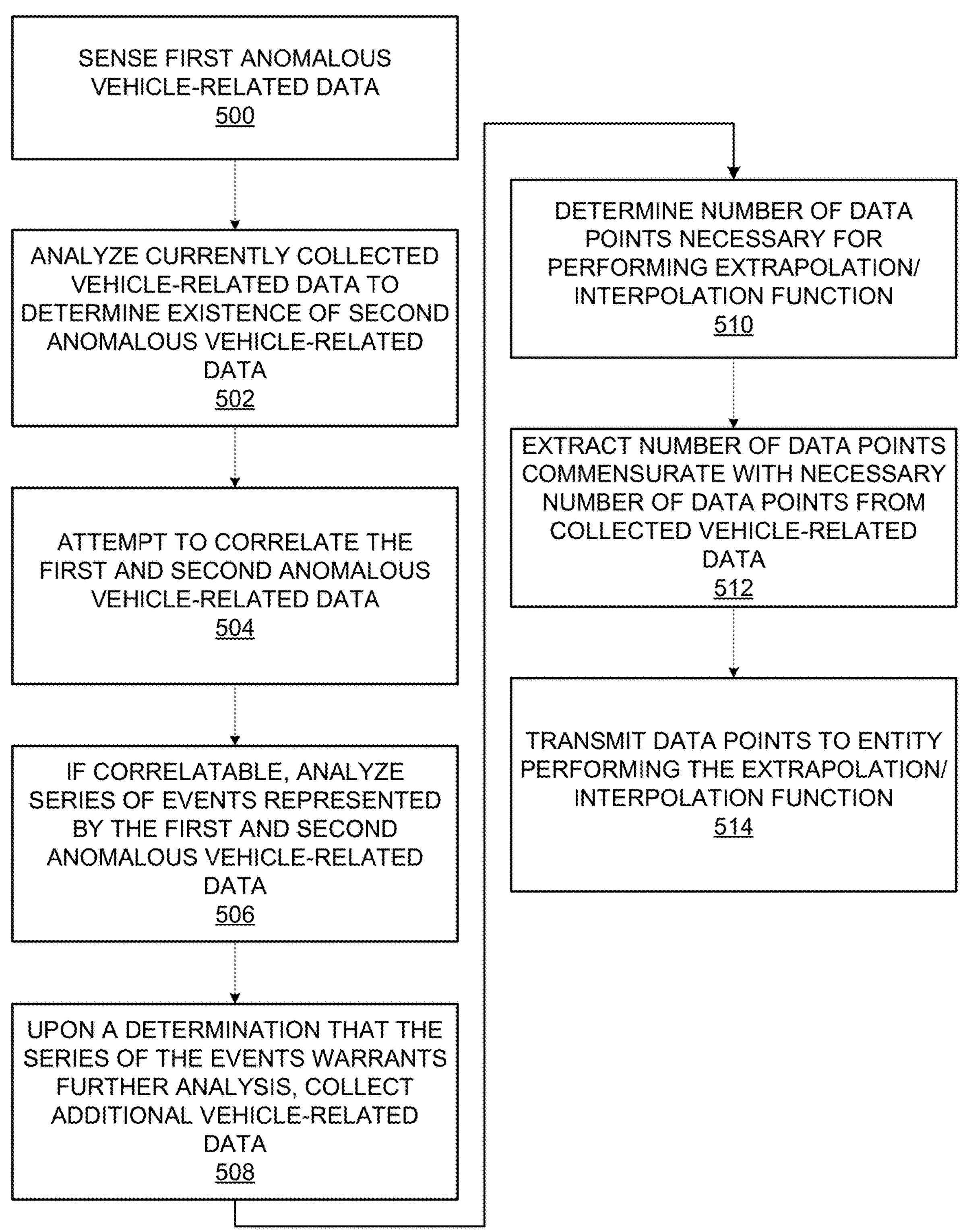
FIG. 5 is a flow chart illustrating example operations for implementation pre-filtering in accordance with another embodiment.

FIG. 5 is a flow chart illustrating example operations that can be performed to pre-filter data in accordance with another embodiment of the present disclosure. The operations illustrated in FIG. 5 and described herein can be performed by pre-filtering circuit 210, for example. At operation 500, first anomalous vehicle-related data may be sensed. As described above, a vehicle, e.g., vehicle 10, may have various on-board sensors 52, and can receive information from other data sources, such as other vehicles, RSUs, third-party information sources, such as traffic information providers. Thus, decision circuit 203 of pre-filtering circuit 210 may, upon receipt of a first vehicle-related data (or data set) can determine that, e.g., a threshold regarding that type of vehicle-related data/data set has been surpassed.

At operation 502, the currently collected vehicle-related data can be analyzed to determine the existence of second anomalous vehicle-related data. For example, in a case where pre-filtering circuit 210 is continuously receiving and caching sensor data, that cached sensor data may be analyzed to determine if any other sensor data also exceeds some threshold for that type of data.

At operation 504, an attempt to correlate the first and second anomalous vehicle-related data is made. That is, the decision circuit 203, based for example, on a known scenario pattern or known relationship between the types of data represented by the first and second anomalous vehicle-related data, can determine that the vehicle-related data are correlatable. If so, at operation 506, the series of events represented by the first and second anomalous vehicle-related data are analyzed. That is, the anomalous vehicle-related data may confirm (by the existence of two sets or instances of data) that some scenario or event has occurred warranting further analysis. Hence, at operation 508, additional vehicle-related data is collected.

At operation 510, similar to operation 402 of FIG. 4, a number of data points necessary for performing at least one of an extrapolation and interpolation function is determined. For example, the above-mentioned scenario pattern may be used/referenced to determine the number of data points needed to make a prediction, confirm a scenario or event, or perform any relevant AI or ML analysis of data. In some embodiments, the pre-filtering circuit 210, in particular, the decision circuit 203, may be pre-programmed with information/instructions regarding the requisite number of data points that should be collected for transmission to the entity performing the extrapolation/interpolation function. In other embodiments, that entity may in real-time or within a particular time period, instruct the pre-filtering circuit 210 as to how many data points are needed. In still other embodiments, that entity may update a scenario pattern or adjust its instructions regarding the number of data points that are needed. In this way, even if vehicle sensors are constantly or continuously collecting data, if the vehicle is receiving copious amounts of information, only the requisite data needed for AI/ML use is actually sent.

At operation 512, similar to operation 404 of FIG. 4, the number of data points commensurate with the necessary number of data points are extracted from the collected vehicle-related data. It should be understood that an AI model, for example, or the scenario pattern may dictate whether the necessary data points are equally (e.g., every X seconds) or non-equally distributed relative to time of collection.

At operation 514, similar to operation 406 of FIG. 4, the extracted data points are transmitted to the entity performing the at least one of the extrapolation and interpolation function. Again, the entity may be a network edge device, a cloud server, or some AI/ML system resident on the vehicle. In this way, the amount of data transmitted can be reduced. Moreover, as a result of transmitting less data, the communications resources needed for transmission are occupied less and/or the communication resources need not be as robust as might normally be required when large amounts of data need to be transferred.

Figure 6:
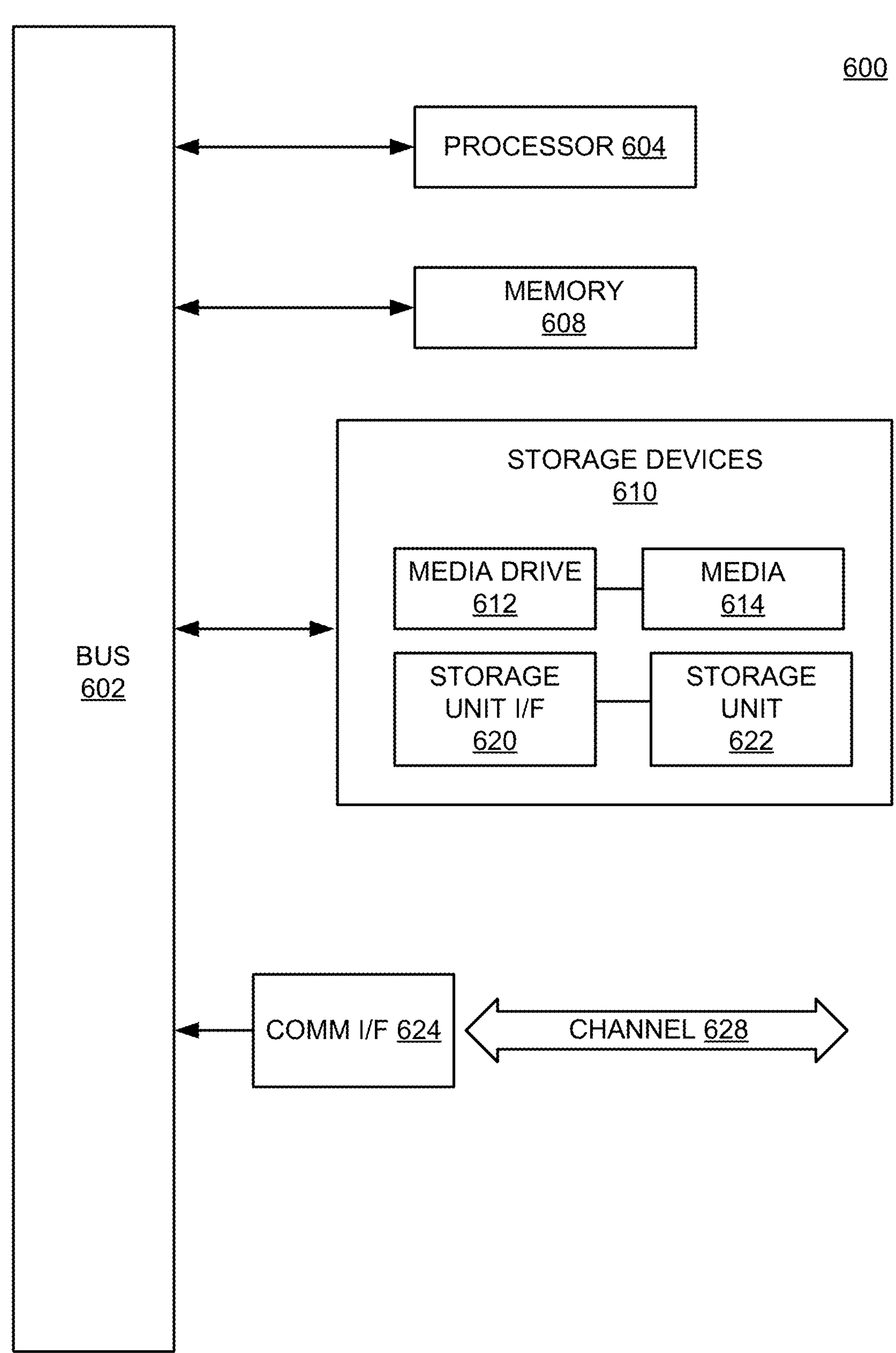
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802. XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:

a sensor;

a communications circuit;

one or more processors; and memory operatively connected to the one or more processors, and including instructions that when executed by the one or more processors, cause the vehicle to:

collect data related to a driving event from the sensors;

determine a scenario pattern for the driving event;

determine, according to the scenario pattern, a scenario pattern-specific sampling rate for sampling data points collected by the sensor for performing at least one of an extrapolation function or an interpolation function for analyzing the driving event;

extract, from the collected data, a number of data points commensurate with the scenario pattern-specific sampling rate; and transmit, via the communications circuit, the extracted data points to an entity performing the at least one of the extrapolation function or the interpolation function for analyzing the driving event.

2. The vehicle of claim 1, wherein the at least one of the extrapolation function or the interpolation function generates an input to a data-reduced artificial intelligence analytics system.

3. The vehicle of claim 1, wherein the scenario pattern specifies the scenario pattern-specific sampling rate for performing the at least one of the extrapolation function or the interpolation function for analyzing the driving event as determined by one of a network edge device, a cloud server, or an artificial intelligence analytics system resident on the vehicle.

4. The vehicle of claim 1, wherein the instructions, when executed by the one or more processors, further cause the vehicle to:

receive, from the entity, an indication that a greater sampling rate is required for analyzing the driving event;

increase the scenario pattern-specific sampling rate for sampling data points collected by the sensor;

extract, from the collected data, a second number of data points commensurate with the increased scenario pattern-specific sampling rate; and transmit the extracted second number of data points to the entity.

5. A pre-filtering circuit of a vehicle, comprising:

one or more processors; and memory operatively connected to the one or more processors, and including instructions that when executed by the one or more processors, cause the pre-filtering circuit to perform:

sensing first anomalous vehicle-related data;

analyzing currently collected vehicle-related data to determine existence of second anomalous vehicle-related data;

attempting to correlate the first and second anomalous vehicle-related data, and if correlatable, analyzing a series of events represented by the first and second anomalous vehicle-related data;

upon a determination that the series of events warrants further analysis, collecting additional vehicle-related data associated with the first and second anomalous vehicle-related data;

determining a scenario pattern for the series of events;

determining, according to the scenario pattern, a a scenario pattern-specific sampling rate for sampling data points collected by a sensor of the vehicle to characterize the series of events using at least one of an extrapolation function or an interpolation function; and transmitting, to a computing entity performing the at least one of the extrapolation function or the interpolation function, the first and second anomalous vehicle-related data and an amount of the collected additional vehicle-related data collected by the sensor commensurate with the scenario pattern-specific sampling rate.

6. The pre-filtering circuit of claim 5, wherein the first and second anomalous vehicle-related data comprise anomalous data values relative to first and second thresholds, respectively.

7. The pre-filtering circuit of claim 6, wherein the first and second thresholds characterize preferred vehicle operating limits or conditions.

8. The pre-filtering circuit of claim 5, wherein attempting to correlate the first and second anomalous vehicle-related data comprises basing the attempted correlation on relational information pre-programmed in the pre-filtering circuit.

9. The pre-filtering circuit of claim 5, wherein the instructions, when executed by the one or more processors, further cause the pre-filtering circuit to perform:

receiving, from the computing entity, an indication that a greater sampling rate is required for analyzing the series of events;

increasing the scenario pattern-specific sampling rate for sampling data points collected by the sensor; and transmitting, to the computing entity, an amount of the additional vehicle-related data collected by the sensor commensurate with the increased scenario pattern-specific sampling rate.

10. A vehicle, comprising:

a communications circuit receiving vehicle-related data;

a pre-filtering circuit operatively connected to the communications circuit, the pre-filtering circuit:

determining whether the received vehicle-related data contains first anomalous data relative to a first vehicle operating threshold;

in response to a determination that the received vehicle-related data contains first anomalous data, triggering collection of additional vehicle-related data;

determining a scenario pattern for the first anomalous data and the additional vehicle-related data;

determining, according to the scenario pattern, a scenario pattern-specific sampling rate for sampling data points from the additional vehicle-related data to characterize one or more vehicle-related events represented by the first anomalous data and the additional vehicle-related data using at least one of an extrapolation function or an interpolation function;

extract, from the additional vehicle-related data, a number of data points commensurate with the scenario pattern-specific sampling rate;

transmitting only the first anomalous data and the extracted data points to an artificial intelligence system using the at least one of the extrapolation function or the interpolation function to characterize the one or more vehicle-related events.

11. The vehicle of claim 10, further comprising a plurality of operational sensors from which at least a portion of the vehicle-related data and the additional vehicle-related data originates.

12. The vehicle of claim 10, wherein the communications circuit receives vehicle-to-everything communications from at least one of a roadside unit and a neighboring vehicle from which at least a portion of the vehicle-related data and the additional vehicle-related data originates.

13. The vehicle of claim 10, wherein the pre-filtering circuit further is:

receiving, from the artificial intelligence system, an indication that a greater sampling rate is required for analyzing the one or more vehicle-related events;

increase the scenario pattern-specific sampling rate for sampling data points from the additional vehicle-related data;

extract, from the additional vehicle-related data, a second number of data points commensurate with the increased scenario pattern-specific sampling rate; and transmit the extracted second number of data points to the artificial intelligence system.

* * * * *